US005258154A

United States Patent [19]

Okuyama et al.

[11] Patent Number: 5,258,154

[45] Date of Patent: Nov. 2, 1993

[54] METHOD FOR PRODUCING SEAMLESS TUBE OR USE AS INTERMEDIATE IMAGE-TRANSFER BELT

[75] Inventors: Katsumi Okuyama; Makoto Morikoshi; Toshihiko Tanimoto; Michiya Okamura; Hideto Shimizu, all of Yokkaichi, Japan

[73] Assignee: Mitsubishi Petrochemical Company Limited, Tokyo, Japan

[21] Appl. No.: 824,233

[22] Filed: Jan. 16, 1992

[30] Foreign Application Priority Data

Jan. 18, 1991 [JP] Japan .................................... 3-4600

[51] Int. Cl.[5] .............................................. B29C 47/90

[52] U.S. Cl. .................................... 264/105; 264/150; 264/209.4

[58] Field of Search ..................... 264/105, 150, 209.3, 264/209.4, 568; 425/380

[56] References Cited

U.S. PATENT DOCUMENTS

| | | | |
|---|---|---|---|
| 4,462,953 | 7/1984 | Feil et al. | 264/566 |
| 4,698,196 | 10/1987 | Fabian | 264/565 |
| 4,828,770 | 5/1989 | Fabian et al. | 264/565 |
| 5,096,653 | 3/1992 | Nedzu | 264/564 |

FOREIGN PATENT DOCUMENTS

| | | | |
|---|---|---|---|
| 61-84214 | 4/1986 | Japan | 264/104 |
| 62-15231 | 1/1987 | Japan | 264/108 |

*Primary Examiner*—Jeffery Thurlow
*Attorney, Agent, or Firm*—Koda and Androlia

[57] ABSTRACT

A method for producing a seamless tube for use as an intermediate image-transfer belt, comprising the step of continuously extruding an electrically conductive composition comprising the following components (a), (b) and (c) to form an unstretched seamless tube having a thickness of 50 to 1000 $\mu$m and a sheet resistance of $10^5$ to $10^{13}$ $\Omega/\square$: (a) a thermoplastic aromatic polycarbonate resin, (b) a thermoplastic poly(alkylene terephthalate) resin and (c) acetylene black, the amount of the component (a) being from 60 to 95 wt. % of the total weight of the component (a) and the component (b) the amount of the component (b) being from 40 to 5 wt. % of the total weight of the component (a) and the component (b), and the amount of the component (c) being from 10 to 25 parts by weight for 100 parts by weight of the total amount of the component (a) and the component (b).

6 Claims, 1 Drawing Sheet

METHOD FOR PRODUCING SEAMLESS TUBE OR USE AS INTERMEDIATE IMAGE-TRANSFER BELT

BACKGROUND OF THE INVENTION

1. Field of the Invention

This invention relates to a method for producing an unstretched seamless tube for use as an intermediate image-transfer belt which is used in the intermediate image-transfer device of an electrophotographic copying machine, a laser printer or the like.

2. Background Art

In a conventional recording apparatus which produces a multicolored image, such as an electrophotographic copying machine, a recording method in which a plastic endless belt is employed as an intermediate image-transfer belt is adopted with a view to avoiding damage to a photoreceptor and obtaining a clear and sharp image free from deviation or fading in color and devoid portions (see Japanese Patent Laid Open Publication No. 2-108072).

In the above method employing a plastic endless belt as an intermediate image-transfer belt, toner images in a plurality of colors are respectively formed on a recording medium such as a photoreceptor, and the toner images thus formed are electrostatically transferred to the intermediate image-transfer belt so that all the toner images can be successively superposed. The toner image thus formed on the intermediate image-transfer belt is then transferred to a recording paper to finally obtain a colored image thereon.

In the above method, as described above, the toner images formed on the photoreceptor are electrostatically transferred to the endless intermediate image-transfer belt. It is therefore important that the belt has a proper degree of electric conductivity.

As a material for an intermediate image-transfer belt having a proper degree of electric conductivity, there has been proposed an electrically conductive resin composition prepared by incorporating an electrically conducting filler such as carbon black into a thermoplastic resin such as a polycarbonate resin or a poly(ethylene terephthalate) resin.

However, as reported in Japanese Patent Laid Open Publication No. 63-311263 an intermediate image-transfer belt made from such a resin composition often exhibits insufficient electric conductivity. Moreover, the conventional belt has various drawbacks such as, for example, uneven electric conductivity due to the poor affinity of carbon black for some types of resins, a rough surface and an insufficient mechanical strength. As a result, an image finally obtained is poor in quality due to deviation or fading in color, or the presence of devoid portions.

Further, as described in Japanese Patent Laid-Open Publication No. 63 311263, the conventional intermediate image-transfer belt is prepared in such a manner that a starting material is first made into a sheet, and then the both ends of the sheet are joined together to form an endless belt. The joint area, which is thicker than the other portion of the belt, has an electric conductivity different from that of the other portion. There is thus another problem in the conventional intermediate image-transfer belt that the joint area cannot be utilized as an image-transfer medium.

It is therefore an object of the present invention to provide a method for the production of a seamless tube, for use as an intermediate image-transfer belt, which has a uniform electric conductivity, a smooth surface and a high mechanical strength.

SUMMARY OF THE INVENTION

It has now been found by the present inventors that the above object is achieved when an electrically conductive resin composition comprising specific components in a specific proportion is used as a starting material and the material is molded in a specific manner directly into a seamless tube.

Thus, the present invention provides a method for producing a seamless tube for use as an intermediate image-transfer belt, comprising the step of continuously extruding an electrically conductive composition comprising the following components (a), (b) and (c) to form an unstretched seamless tube having a thickness of 50 to 1000 $\mu$m and a sheet resistance of $10^5$ to $10^{13}$ $\Omega/\square$:

(a) a thermoplastic aromatic polycarbonate resin, (b) a thermoplastic poly(alkylene terephthalate) resin and (c) acetylene black, the amount of the component (a) being from 60 to 95 wt. % of the total weight of the component (a) and the component (b), the amount of the component (b) being from 40 to 5 wt. % of the total weight of the component (a) and the component (b), and the amount of the component (c) being from 10 to 25 parts by weight for 100 parts by weight of the total amount of the component (a) and the component (b).

DESCRIPTION OF THE INVENTION

[1] Electrically Conductive Resin Composition

(1) Components of the composition

Figure 1:
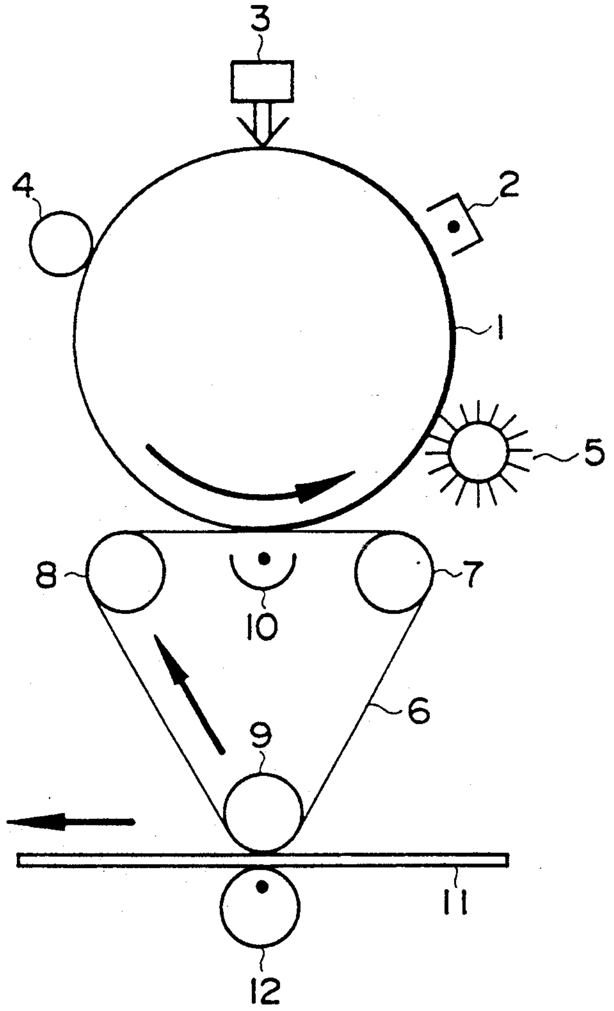
FIG. 1 is a schematic view of a color-image recording apparatus used in the working examples described below.

The electrically conductive resin composition used for preparing the seamless tube in accordance with the present invention basically comprises three components, (a) a thermoplastic aromatic polycarbonate resin, (b) a thermoplastic poly(alkylene terephthalate) resin and (c) acetylene black, which will be explained below.

(a) Thermoplastic aromatic polycarbonate resin:

The aromatic polycarbonate resin, which is one of the two thermoplastic resins used in the present invention, is one prepared by reacting a dihydroxy compound, such as a polyhydric phenol having at least two phenolic hydroxyl groups, with a carbonate precursor such as phosgene, bischloroformate or carbonic diester.

As the polyhydric phenol for use in the above reaction, in particular, as dihydric phenols, bisphenols can be mentioned, in which bisphenol A is particularly preferred.

It is preferable that the aromatic polycarbonate resin have a molecular weight of 22,000 to 33,000, more preferably 24,000 to 31,000, and a melt flow rate (MFR) of 0.5 to 5 g/10 min, preferably 1 to 4 g/10 min, as measured in accordance with JIS (Japanese Industrial Standard) K 7210-1975 under the conditions of a temperature of 280° C. and a load of 2.16 kg.

In general, such an aromatic polycarbonate resin is selected from the commercially available ones.

(b) Thermoplastic poly(alkylene terephthalate) resin:

The poly(alkylene terephthalate) (PAT) resin, which is the other thermoplastic resin used in the present invention, contains the alkylene moiety deriving from glycols such as ethylene glycol, triethylene glycol, 1,4-butanediol, hexamethylene glycol, neopentyl glycol and 2,2,4,4-tetramethylene glycol. Among the glycols, ethylene glycol and butylene glycol are preferred. Mixtures of ethylene glycol or butylene glycol with other glycols in an amount of up to 40 mol % are also preferred.

On the other hand, the terephthalic acid moiety of PAT is most preferably derived from terephthalic acid only. However, a PAT in which the terephthalic acid moiety is partially replaced with other aromatic dicarboxylic acids such as isophthalic acid may also be used.

Poly(ethylene terephthalate) (PET) and poly(butylene terephthalate) (PBT) are preferred as the PAT component (b) in the present invention, and PBT is most preferred. Various kinds of PAT including PET and PBT are commercially available.

(c) Acetylene black:

In the present invention, it is important to use acetylene black having high dispersibility in order to control the distribution of resistance in the electrically semiconductive region and not to impair the appearance of the finally obtainable seamless tube.

Acetylene black having a particle size of, in general, from 10 to 1,000 Å, preferably from 50 to 950 Å, and a specific surface area of 10 to 150 $m^2/g$, preferably 20 to 100 $m^2/g$, is favorably used in the present invention.

(d) Additional components:

The electrically conductive resin composition of the present invention may further comprise various additives which are incorporated into conventional resin compositions, unless they do not substantially impair the intended properties of the resin composition. Examples of such additives include an antioxidant, a lubricant and a releasing agent.

(2) Proportion of the components

To prepare the electrically conductive resin composition for use in the present invention, it is necessary to mix the foregoing components in the belowdescribed proportion.

(a) Thermoplastic aromatic polycarbonate resin:

The amount of the thermoplastic aromatic polycarbonate resin, the component (a), is from 60 to 95 wt. %, preferably from 70 to 95 wt. %, of the total weight of the component (a) and the thermoplastic poly(alkylene terephthalate) resin, the component (b).

(b) Thermoplastic poly(alkylene terephthalate) resin:

The amount of the thermoplastic poly(alkylene terephthalate) resin is from 40 to 5 wt. %, preferably from 30 to 5 wt. %, of the total weight of the component (a) and the component (b).

(c) Acetylene black:

The amount of the acetylene black, the component (c), is from 10 to 25 parts by weight, preferably from 10 to 20 parts by weight, for 100 parts by weight of the total amount of the component (a) and the component (b).

The sheet resistance of the finally obtainable seamless tube can be arbitrarily controlled in the range of $10^5$ to $10^{13}$ Ω/□, preferably $10^7$ to $10^{10}$ Ω/□, with an exponential deviation within an order of ±1, by selecting the amounts of the components (a), (b) and (c) within the above-specified respective ranges. When an exponential deviation in the sheet resistance distribution is in excess of an order of ±1, a clear image cannot be finally obtained because of uneven image transfer by the intermediate image transfer belt.

When the component (a) and the component (b) are employed in a proportion outside the above-described range, a seamless tube having a sheet resistance of $10^5$ to $10^{13}$ Ω/□, which is required for an intermediate image-transfer belt to be used in an intermediate image-transfer device, with an exponential deviation in the sheet resistance distribution within an order of ±1 cannot be successfully obtained. Moreover, when the amount of the component (a) is less than the above range, the resulting seamless tube has a poor rigidity. The intermediate image transfer belt is therefore liable to be stretched upon operation, causing uneven image transfer. Also in this case,namely in the case where the amount of the component (b) is more than the above range, the acetylene black cannot be thoroughly dispersed in the resin matrix. The resulting seamless tube therefore tends to have a rough surface, and the distribution of the sheet resistance can be controlled with difficulty within an exponential deviation of ±1, leading to uneven image transfer and the presence of devoid portions in a finally reproduced picture image. When the amount of the component (b) is less than the above range, on the other hand, the resulting tube will be of non-rubbery nature and it will thus have a very low resistance to cracking.

When the amount of the component (c), acetylene black, is less than the above range, the finally obtainable seamless tube cannot possess a proper degree of electric conductivity. Thus, the sheet resistance of the tube will exceed $10^{13}$ Ω/□ with a best arranged condition for the production thereof. It is therefore difficult to eliminate electrostatic charges in a short time when transferring a toner image formed on the tube to a recording paper. An image-transfer efficiency is thus decreased. On the other hand, when the amount of the acetylene black is more than the above range, the finally obtainable seamless tube has an excessively high surface electric conductivity, a poor appearance and a reduced mechanical strength. A sheet resistance of less than $10^5$ Ω/□ brings about a leak of the electrostatic charges on the transfer belt. Therefore, the efficiency of toner-image transfer from a photoreceptor to the intermediate image-transfer belt will be lowered.

(3) Preparation of the electrically conductive resin composition

The above-described components are melt-kneaded by a kneader such as a single- or double-screw extruder, a roll mixer or a Banbury mixer, followed by granulation to give pellets.

In the above kneading process, it is desirable to strictly control the water content in each component. In particular, it is desirable to control the water content in each component to 0.5 wt. % or less, preferably 0.2 wt. % or less, and more preferably 1000 ppm or less.

When the mixture on kneading contains more than 0.5 wt. % of water, there is a fear of hydrolysis of the polycarbonate resin which leads to bad appearance of the product. The above water content should desirably be maintained also on the resulting composition during its storage. For this purpose, drying means such as a hot-air drying or a vacuum drying may be adopted, according to necessity.

(4) Properties of the electrically conductive resin composition

The electrically conductive resin composition obtained above has a sheet resistance of $10^5$ to $10^{13}$ Ω/□, preferably $10^7$ to $10^{10}$ Ω/□, as measured by a resistance meter under the conditions of an electric voltage of 100 V and a measuring time of 10 seconds. The MFR of the composition is, in general, from 0.05 to 3 g/10 min, preferably from 0.1 to 2 g/10 min. The folding endurance as measured in accordance with JIS P8115 is, in general, 100 times or more, preferably 200 times or more. The strength as measured in accordance with JIS K7127 is, in general, 500 kg/cm$^2$ or more, preferably 600 kg/cm$^2$ or more.

[II] Production of Seamless Tube

According to the present invention, the electrically conductive resin composition is continuously melt-extruded to obtain the seamless tube for use as an intermediate image transfer belt. An injection molding method and a blow molding method are not suitable in the present invention. This is because these are noncontinuous intermittent molding methods, so that a tube obtained by these methods is unevenly orientated in the flow direction of the tube, perpendicular to the circumferential direction. The electric conductivity of the belt should therefore be unevenly distributed in the direction of the width of the belt, and the distribution of sheet resistance cannot be controlled within an exponential deviation of an order of ±1.

To prepare a seamless tube having a diameter of 30 mm or more, it is preferable to employ an internal cooling mandrel forming method in which the electrically conductive resin composition is continuously melt-extruded downward as described, for instance, in Japanese Patent Laid-Open Publication No. 1-228823. This method is advantageous in that the inside diameter of the tube is accurately controllable.

To prepare a seamless tube having a diameter of less than 30 mm, a vacuum sizing method may be preferably employed.

The extruded tube is required to be an unstretched tube so as to possess a proper surface electric conductivity, an even thickness, a sufficiently-high mechanical strength and high resistance to cracking. If the extruded tube is subjected to a stretching operation, though the improvement in the mechanical strength of the tube can be expected, the evenness in the distribution of electric conductivity is impaired. Moreover, since the resistance to cracking is reduced, it is likely that the tube is readily torn in the direction of stretch and separation of the particles of carbon black from the resin may occur at the interface therebetween. The particles of carbon black thus fall off the tube, which causes uneven image transferring.

[III] Seamless Tube

The thickness of the seamless tube is, in general, from 50 to 1,000 μm, preferably from 100 to 700 μm. A seamless tube with a thickness of less than 50 μm is readily stretched, so that an image which is uniform in color cannot be obtained. In addition, such a seamless tube possesses a poor electric breakdown voltage, so that an electric voltage needed to impart electric charges required for transfer of a toner image cannot be applied to the tube. On the other hand, a seamless tube with a thickness of more than 1,000 μm is poor in flexibility and is hardly deformed, so that it cannot be driven by small rollers at a constant speed. As a result, deviation tends to occur in an image transferred. Moreover, since the electrostatic capacity of the tube becomes small, it is necessary to use a complicated and expensive device for supplying a high voltage in order to impart a sufficient electric charges needed for transfer of a toner image. Such a high-voltage device not only increases the production cost, but also tends to bring about troubles such as discharge between the device and circumferential devices due to the high voltage.

The seamless tube should have a smooth surface. The surface roughness, $R_z$, of the seamless tube is preferably 2 μm or less. The distribution of the sheet resistance should be such that an exponential deviation is within an order of ±1, preferably within an order of ±0.7.

The seamless tube of the present invention can be used as it is as an intermediate image-transfer belt, or can be used by winding it round a drum or the like.

Furthermore, a heat-resistant tape, a silicone rubber, etc. may be adhered to the edge of the tube for the purposes of reinforcement of the tube edge, prevention of meandering on operation, etc.

The present invention will be described in more detail in the following working examples, which are given merely for illustrating the invention and are not intended to be limiting thereof.

The tubes obtained in the below-described Examples and Comparative Examples were evaluated in terms of the following items in the following respective manners:

(1) Electric Conductivity

Sheet Resistance: Ω/□

The sheet resistance was measured by a resistance meter, "High-Rester" or "Low Rester" (Trademarks, manufactured by Mitsubishi Petrochemical Co., Ltd.). The electric voltage applied was 100 V, and the measuring time was 10 seconds.

(2) Distribution of Sheet Resistance

The sheet resistances in both the longer and the circumferential directions of a tube were measured in the above manner with a pitch of 30 mm to determine the distribution of sheet resistance. In Tables 1 and 2, a tube which was found to have such a distribution of sheet resistance that an exponential deviation in the measured resistance values is within ±1 is indicated by "good", and a tube which was found to have the distribution with an exponential deviation in excess of an order of ±1 is indicated by "bad".

(3) Image-Transfer Ability

An image was practically reproduced on a recording paper using a color-image recording apparatus as shown in FIG. 1, in which reference numeral 1 denotes a photoreceptor, 2 an electrifier, 3 a light source for exposure, 4 a developing device, 5 a cleaner, 6 an intermediate image-transfer belt, 7, 8 and 9 rollers, 10 an electrostatic image-transfer device, 11 a recording paper, and 12 a pressing roll.

The obtained image was visually observed in terms of sharpness thereof. In Tables 1 and 2, an image which was sharp, was free from deviation and fading in color, and had no devoid portion is indicated by "good", and an image in which deviation or fading in color, or the presence of devoid portions was found is indicated by "bad".

Example 1

83 parts by weight of a polycarbonate resin ("U-Piron E-2000" manufactured by Mitsubishi Gas Chemical Company Inc.) having an MFR of 4.6 g/10 min (at 280° C.), 17 parts by weight of a poly(butylene terephthalate) resin ("Novadol 5020" manufactured by Mitsubishi Chemical Industry Co., Ltd.) having an MFR of 4.32 g/10 min (at 230° C.) and 14 parts by weight of acetylene black (manufactured by Denki Kagaku Kogyo K. K.) having a specific surface area of 70 $m^2$ were melt-kneaded by a double-screw vented extruder at a temperature of 280° C., followed by granulation to give pellets.

The pellets were melted at a temperature of 280° C., and extruded downward through a ring die with a diameter of 140 mm. The extruded tube in a molten state was brought into contact with the outer surface of a cooling mandrel with a diameter of 130 mm, installed with a supporting rod on the same axis of the ring die, to cool it to a temperature of 100° C., thereby solidifying the tube to form a seamless tube. The seamless tube was then drawn out while maintaining the tube in a cylindrical shape by a core placed inside the tube and a roller placed outside the tube. The tube with a thickness of 150 μm was thus finally obtained. This tube will be cut to a predetermined length to provide a seamless belt for use as an intermediate image-transfer belt.

The above-obtained seamless tube was evaluated in terms of the sheet resistance, the distribution of sheet resistance and the image-transfer ability. The results are shown in Table 1.

Comparative Examples 1 and 2

The procedure of Example 1 was repeated except that the thickness of the seamless tube was changed from 150 μm to 30 μm (Comp. Ex. 1) and to 2000 μm (Comp. Ex. 2), respectively, whereby comparative seamless tubes were obtained.

The above-obtained seamless tubes were respectively evaluated in the same manner as in Example 1. The results are shown in Table 1.

Comparative Example 3

The procedure of Example 1 was repeated except that the amount of the acetylene black was changed from 14 parts by weight to 7 parts by weight, whereby a comparative seamless tube was obtained.

The above-obtained seamless tube was evaluated in the same manner as in Example 1. The results are shown in Table 1.

Comparative Example 4

The procedure of Example 1 was repeated except that the amount of the acetylene black was changed from 14 parts by weight to 30 parts by weight, whereby a comparative seamless tube was obtained.

The above-obtained seamless tube was evaluated in the same manner as in Example 1. The results are shown in Table 1.

Comparative Example 5

The procedure of Example 1 was repeated except that the amount of the polycarbonate resin was changed from 83 parts by weight to 100 parts by weight, the poly(butylene terephthalate) resin used in Example 1 was not used, and the extrusion temperature was changed from 280° C. to 300° C., whereby a comparative seamless tube was obtained.

The above-obtained seamless tube was evaluated in the same manner as in Example 1. The results are shown in Table 1.

Comparative Example 6

The procedure of Example 1 was repeated except that the amount of the polycarbonate resin was changed from 83 parts by weight to 50 parts by weight, the amount of the poly(butylene terephthalate) resin was changed from 17 parts by weight to 50 parts by weight, and the extrusion temperature was changed from 280° C. to 260° C., whereby a comparative seamless tube was obtained.

The above-obtained seamless tube was evaluated in the same manner as in Example 1. The results are shown in Table 1.

TABLE 1

| Properties | Example 1 | Comparative Example 1 | 2 | 3 | 4 | 5 | 6 |
|---|---|---|---|---|---|---|---|
| Thickness (μm) | 150 | 30 | 2000 | 150 | 150 | 150 | 150 |
| Sheet Resistance (Ω/□) | $10^8$ | $10^9$ | $10^7$ | $10^{15}$ | $10^4$ | $10^7$ | $10^9$ |
| Distribution of Sheet Resistance | good | good | good | good | good | bad | bad |
| Image-Transfer Ability | good | bad | bad | bad | bad | bad | bad |

Example 2

70 parts by weight of a polycarbonate resin ("U-Piron E-2000 Powder" manufactured by Mitsubishi Gas Chemical Company Inc.) having an MFR of 2.0 g/10 min (at 280° C.), 30 parts by weight of a poly(butylene terephthalate) resin ("Novadol 5010" manufactured by Mitsubishi Chemical Industry Co., Ltd.) having an MFR of 9.0 g/10 min (at 230° C.) and 10 parts by weight of acetylene black (manufactured by Denki Kagaku Kogyo K. K.) having a specific surface area of 70 $m^2$ were melt-kneaded by a double-screw vented extruder at a temperature of 280° C., followed by granulation to give pellets.

A seamless tube was prepared using the above-obtained pellets, and evaluated in the same manner as in Example 1. The results are shown in Table 2.

Example 3

The procedure of Example 2 was repeated except that the amount of the polycarbonate resin was changed from 70 parts by weight to 95 parts by weight and that of the poly(butylene terephthalate) resin was changed from 30 parts by weight to 5 parts by weight, whereby a seamless tube according to the present invention was obtained.

The above-obtained seamless tube was evaluated in the same manner as in Example 1. The results are shown in Table 2.

Example 4

The procedure of Example 2 was repeated except that the amount of the polycarbonate resin was changed from 70 parts by weight to 83 parts by weight, that of the poly(butylene terephthalate) resin was changed from 30 parts by weight to 17 parts by weight and that of the acetylene black was changed from 10 parts by weight to 20 parts by weight, whereby a seamless tube according to the present invention was obtained.

The above-obtained seamless tube was evaluated in the same manner as in Example 1. The results are shown in Table 2.

Comparative Example 7

The procedure of Example 1 was repeated except that the poly(butylene terephthalate) resin used in Example 1 was replaced by an ABS resin ("Taflex 227" manufactured by Mitsubishi Kasei Polytech Company), whereby a comparative seamless tube was obtained.

The above-obtained seamless tube was evaluated in the same manner as in Example 1. The results are shown in Table 2.

Comparative Example 8

The procedure of Example 1 was repeated except that the acetylene black used in Example 1 was replaced by ketchen black ("Ketchen Black EC" manufactured by Ketchen Black International Corp.), whereby a comparative seamless tube was obtained.

The above-obtained seamless tube was evaluated in the same manner as in Example 1. The results are shown in Table 2.

Comparative Example 9

The procedure of Example 1 was repeated except that the acetylene black used in Example 1 was replaced by graphite ("Graphite CPB" manufactured by Nippon Kokuen K. K.), whereby a comparative seamless tube was obtained.

The above-obtained seamless tube was evaluated in the same manner as in Example 1. The results are shown in Table 2.

TABLE 2

| | Example | | | Comparative Example | | |
|---|---|---|---|---|---|---|
| Properties | 2 | 3 | 4 | 7 | 8 | 9 |
| Thickness ($\mu m$) | 150 | 150 | 150 | 150 | 150 | 150 |
| Sheet Resistance ($\Omega/\square$) | $10^{11}$ | $10^{10}$ | $10^{7}$ | $10^{11}$ | $10^{1}$ | $10^{13}$ |
| Distribution of Sheet Resistance | good | good | good | bad | bad | bad |
| Image-Transfer Ability | good | good | good | bad | bad | bad |

What is claimed is:

1. A method for producing an unstretched seamless tube for use as an intermediate image-transfer belt, comprising the step of continuously extruding onto a support an electrically conductive composition comprising the following components (a), (b) and (c) to form an unstretched seamless tube having a thickness of 50 to 1000 $\mu m$ and a sheet resistance of $10^5$ to $10^{13}$ $\Omega/\square$ within an exponential deviation within $\pm 1$.
   (a) a thermoplastic aromatic polycarbonate resin,
   (b) a thermoplastic poly(alkylene terephthalate) resin and
   (c) acetylene black,
   the amount of the component (a) being from 60 to 95 wt. % of the total weight of the component (a) and the component (b)
   the amount of the component (b) being from 40 to 5 wt. % of the total weight of the component (a) and the component (b), and
   the amount of the component (c) being from 10 to 25 parts by weight for 100 parts by weight of the total amount of the component (a) and the component (b).

2. The method according to claim 1, wherein the polycarbonate resin is a bisphenol derived from A.

3. The method according to claim 1, wherein the polycarbonate resin (a) has a molecular weight of 22,000 to 33,000.

4. The method according to claim 1, wherein the polycarbonate resin (a) has a melt flow rate of 0.5 to 5 g/10 min.

5. The method according to claim 1, wherein the poly(alkylene terephthalate) resin (b) is a poly(butylene terephthalate) resin.

6. The method according to claim 1, wherein the acetylene black (c) has a particle size of 50 to 950 Å and a specific surface area of 20 to 100 $m^2/g$.

* * * * *

UNITED STATES PATENT AND TRADEMARK OFFICE

CERTIFICATE OF CORRECTION

PATENT NO. : 5,258,154

DATED : November 2, 1993

INVENTOR(S) : Katsumi Okuyama et al.

It is certified that error appears in the above-indentified patent and that said Letters Patent is hereby corrected as shown below:

On the title page, item [54] and column 1, line 3, change "OR" to --FOR--.

Signed and Sealed this

Nineteenth Day of April, 1994

Attest:

Bruce Lehman

BRUCE LEHMAN

*Attesting Officer*

*Commissioner of Patents and Trademarks*